Figure 6:
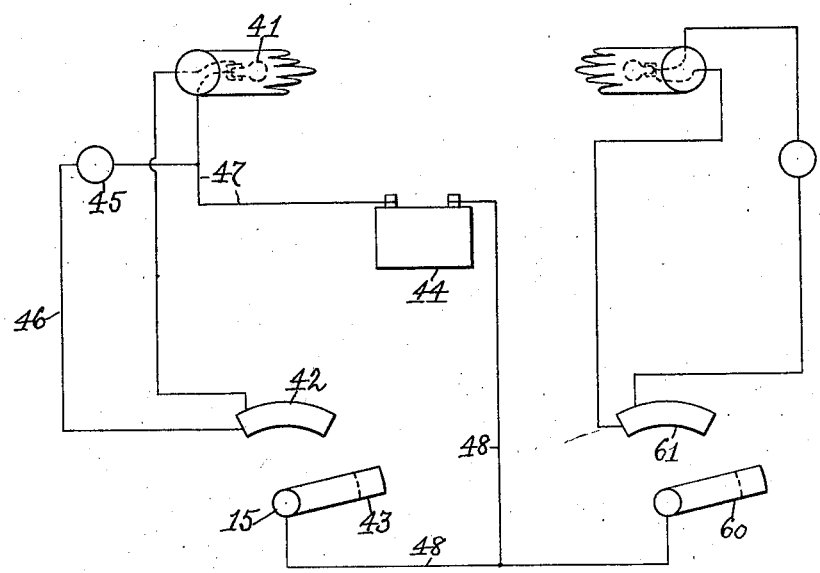

Apr. 3, 1923.  1,450,553
L. J. KILLIAN ET AL
SIGNALING APPARATUS FOR MOTOR VEHICLES
Filed June 12, 1922  3 sheets-sheet 1
Fig. 1.
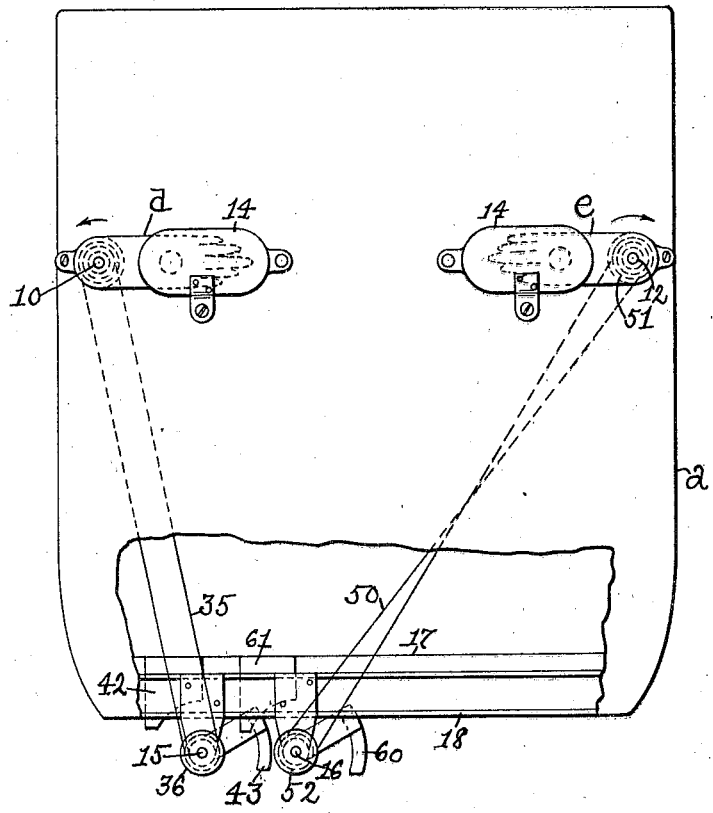
Fig. 2.
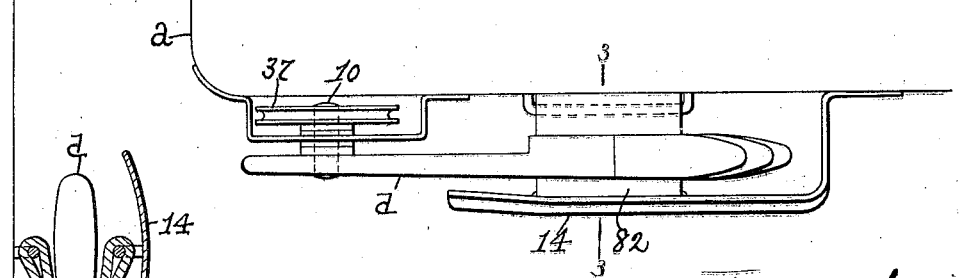
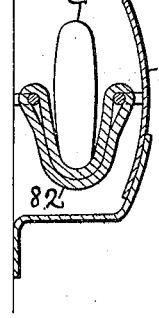
Fig. 3.
Inventors.
Lawrence J. Killian
Eugene J. Parker
by Jas. H. Churchill
atty.

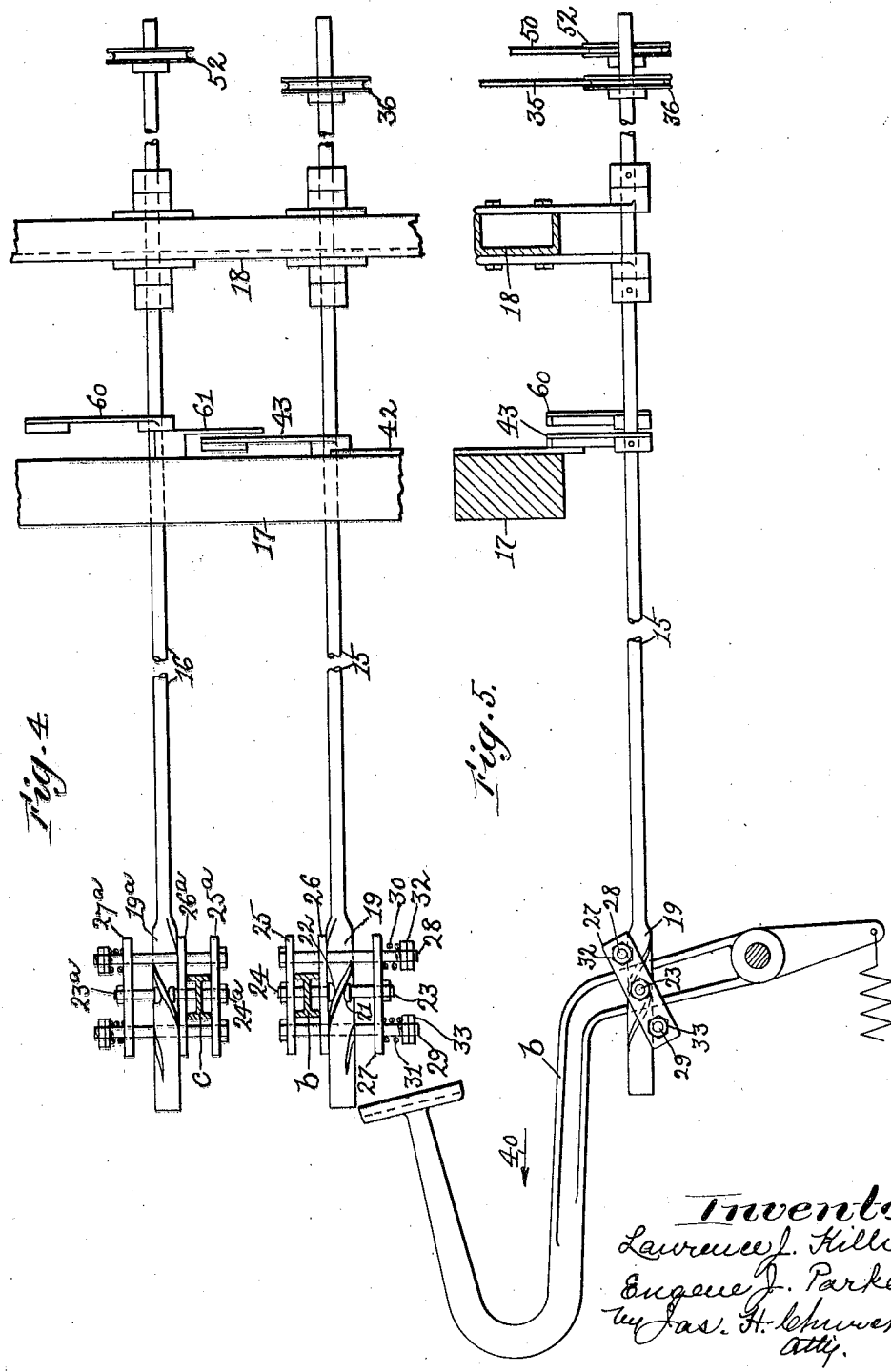

Apr. 3, 1923.  
L. J. KILLIAN ET AL  
1,450,553  
SIGNALING APPARATUS FOR MOTOR VEHICLES  
Filed June 12, 1922   3 sheets-sheet 3

Inventors.  
Lawrence J. Killian  
Eugene J. Parker  
by Jas. H. Churchill  
atty.

Patented Apr. 3, 1923.

1,450,553

UNITED STATES PATENT OFFICE.

LAURENCE J. KILLIAN, OF BOSTON, AND EUGENE J. PARKER, OF LYNN, MASSACHUSETTS.

SIGNALING APPARATUS FOR MOTOR VEHICLES.

Application filed June 12, 1922. Serial No. 567,527.

*To all whom it may concern:*

Be it known that we, LAURENCE J. KILLIAN and EUGENE J. PARKER, both citizens of the United States, and residents of Boston and Lynn, in the counties of Suffolk and Essex and State of Massachusetts, respectively, have invented an Improvement in Signaling Apparatus for Motor Vehicles, of which the following description, in connection with the accompanying drawings, is a specification, like characters on the drawings representing like parts.

This invention relates to a signaling apparatus for use on motor vehicles, such as automobiles, motor trucks and the like, for signaling the intention of the operator of the vehicle with respect to the movement of the vehicle.

The invention has for its object to provide a simple, efficient and inexpensive mechanically-operated apparatus with which turning movement of the vehicle to the right and left and stopping of the vehicle may be indicated.

To this end, a signaling device located at or near the rear of the vehicle is operatively connected with a rock-shaft, which is operatively connected with a foot-operated lever of the vehicle, which may be the clutch or brake lever of motor vehicles provided with internal combustion engines.

It is preferred to employ two signaling devices, one to indicate turning to the left and the other turning to the right and to connect one with the clutch lever and the other to the foot-operated brake lever.

Provision is also made for illuminating the signaling devices, and to this end, electric lamps are employed, which are included in electric circuits controlled from the rock-shafts as will be described.

Each rock-shaft may and preferably will be provided with a screw-shaped portion, which is connected with its operating lever, so as to be rotated by movement of the said lever and so as to permit the lever to be further moved without effecting further rotation of the rock-shaft, as will be described.

These and other features of this invention will be pointed out in the claims at the end of this specification.

Fig. 1 is a rear elevation of the body portion of one form of automobile provided with signaling apparatus embodying this invention, the body of the automobile being partially broken away.

Fig. 2, a detail in plan illustrating the left hand signaling device shown in Fig. 1.

Fig. 3, a detail in section on the line 3—3, Fig. 2.

Fig. 4, a plan of the rock-shafts to illustrate the connection of the same with the clutch and brake levers, which are shown in section.

Fig. 5, a side elevation of the parts shown in Fig. 4.

Fig. 6, a diagram of circuits to be referred to, and

Figure 7:
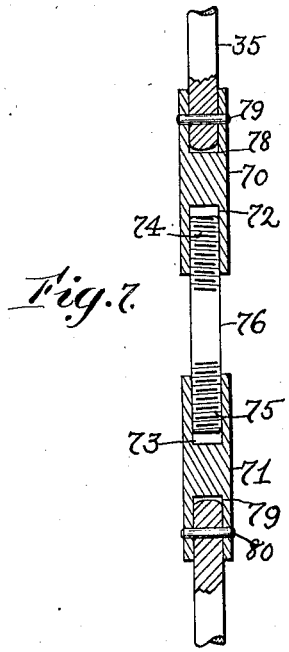

Fig. 7, a sectional detail of a belt connector to be referred to.

Referring to the drawing *a* represents a motor vehicle of the pleasure type, which is provided with the usual internal combustion engine, not shown, and with the usual foot-operated clutch lever *b*, and brake lever *c*.

The motor vehicle *a* is provided at or near its rear end with signaling devices *d*, *e*, herein shown in the form of hands, which are mounted on rotatable shafts 10, 12, suitably supported by the motor vehicle *a* and capable of being rotated in opposite directions so as to move the hands *d*, *e*, from their normal position shown in Fig. 1, into a position diametrically opposite, in which latter position they preferably extend beyond the sides of the vehicle *a*.

The hands *d*, *e*, in their normal position may be wholly or partially concealed by a cover or shield 14 attached to the vehicle *a*.

In the present instance, the hand *d* is mechanically connected with the clutch lever *b*, and the hand *e* is mechanically connected with the brake lever *c*.

To this end, two rock-shafts 15, 16, are employed, which are extended lengthwise of the vehicle and suitably supported by cross bars 17, 18, of the chassis.

The rock-shaft 15 is provided at its front end with a twisted or screw-shaped portion 19, whose opposite surfaces are engaged by the rounded heads 21, 22, of bolts 23, 24, carried by a frame attached to the clutch lever *b*.

The frame referred to comprises two, bars 25, 26 located on one side of the twisted or screw portion 19 of the rock-shaft, and a third bar 27 located on the opposite side.

The bars 25, 26 are securely clamped to the clutch lever $b$ by the bolt 24, and the bar 27 is connected with the bars 25, 26, by the bolts 28, 29, which extend over and under the screw portion 19 of the rock-shaft 15 (see Fig. 5) and serve to support the rock-shaft at its front end.

The side bar 27 is loosely mounted on the bolts 28, 29, so as to slide thereon and the head 21 of the bolt is kept in contact with the screw portion 19 of the rock-shaft 15, by springs 30, 31, on the bolts 28, 29, located between the bar 27 and nuts 32, 33, on the bolts 28, 29.

By reference to Fig. 4, it will be seen that when the clutch lever $b$ is moved forward in the direction indicated by the arrow 40 to throw out the clutch, the bolt 24 cooperates with the screw portion 19 to rotate the rock-shaft 15 in one direction, and that as the rock-shaft is turned, the bolt 23 and the bar 27 are forced backward against the action of the springs 30, 31, which latter keep the bolt 23 in engagement with the screw portion and serve to turn the rock-shaft 15 in the opposite direction, when the clutch lever $b$ is moved in the direction opposite to that indicated by the arrow 40.

When the clutch lever $b$ is moved by the operator in the direction of the arrow 40 to throw out the clutch, the signaling device $d$ is turned from its normal or inward position shown in Fig. 1, into its operative or outward position in which it is extended beyond the left hand side of the vehicle, and in the present instance, this rotation of the signaling device $d$ is effected by a belt 35, which connects a pulley 36 on the rock-shaft 15 with a pulley 37 on the pivot or shaft 10 of the signaling device or hand $d$.

Provision is made for illuminating the signaling device $d$ when the latter is turned into its operative position. To this end, the hand $d$ carries an electric lamp 41, which is included in a circuit (see Fig. 6), provided with a switch comprising a stationary member 42 and a movable member 43, which latter is mounted on the rock-shaft 15 and is constructed and arranged to close the circuit of the lamp 41 when the shaft is rocked to turn the hand or device $d$ outward into its operative position, and to open the circuit when the shaft 15 is rocked in the opposite direction and the hand or device $d$ is returned to its inoperative position.

The circuit containing the lamp 41 is supplied with current from the storage battery 44 carried by the motor vehicle, and the switch member 43 also controls an auxiliary lamp 45, which is located on the dasher of the motor vehicle.

The auxiliary lamp 45 is included in a branch conductor 46, which has one end connected with the stationary switch member 42 and its other end with the return wire 47 leading from the lamp 41 back to the negative pole of the battery 44, the positive pole of which is connected by wire 48 to the switch member 43.

The signaling device or hand $e$ is operatively connected with the rock-shaft 16 by a cross belt 50, which is passed about a pulley 51 on the shaft 12 of the hand or device $e$ and about a pulley 52 on the rock-shaft 16, which is provided at its front end with a twisted or screw portion $19^a$ with which co-operates bolts $23^a$, $24^a$, carried by a frame $25^a$ $26^a$ $27^a$ and connected to the brake lever $c$ in the same manner as the carrier or frame for the bolts 23, 24, is connected with the clutch lever $b$. As a result, when the brake lever $c$ is operated by the foot of the operator to apply the brakes (not shown), the rock-shaft 16 is rotated to turn the signal device or hand $e$ from its inoperative into its operative position, in which latter position it projects beyond the right hand side of the vehicle. The rock-shaft 16 also carries the movable switch member 60, which co-operates with the stationary member 61 to close the circuit of the lamp $41^a$ carried by the hand $e$.

The twisted portions 19 of the rock-shaft 15 and $19^a$ of the rock-shaft 16 are preferably made so as to move the hands or signaling devices $d$, $e$, through substantially a semi-circle, and beyond the screw portions the rock-shafts are made straight so as to permit the clutch and brake levers $d$, $e$, to be further moved without effecting rotation of the shafts or movements of the hands or signaling devices $d$, $e$.

By reference to Fig. 1, it will be seen that when the operator desires to indicate that he intends to turn to the left, the signal device or hand $d$ is moved into its operative position by pressing upon the clutch lever $b$, and when he intends to turn to the right the signaling device or hand $e$ is moved into its operative position by pressing upon the brake lever $c$.

To indicate his intention to stop, both signals or hands may be moved into their operative positions, and to indicate his intention to slow down, either or both signaling devices may be moved into a vertical position.

In the construction shown in Fig. 1, it is preferred to provide a suitable cushion 82 for the hand to strike when moved into its inoperative position.

For pleasure vehicles, it may be preferred to attach the signaling devices to the back of the body above the bottom thereof and to connect them with the rock-shaft below the said body as shown and described, but it is not desired to limit the invention in this respect, as the signaling devices may be attached directly to the rock-shafts, which construction is particularly applicable for trucks or commercial motor vehicles.

While it may be preferred to make the signaling devices in the form of hands, to approximate the human hand, it is not desired to limit the invention in this respect, as they may be made in other forms as for instance arrows.

When the belts 35, 50 are used, it is preferred to join their ends by connectors of the construction shown in Fig. 7, wherein metal members 70, 71, are provided with threaded sockets 72, 73, for the reception of the oppositely threaded ends 74, 75, of a rod 76, said metal members having at their opposite ends sockets 77, 78, for the reception of the ends of the belt 35 or 50, which are secured therein by the pins 79, 80.

Claims:

1. The combination with a motor vehicle provided with a foot-operated clutch lever and with a foot-operated brake lever, of signaling devices carried by the vehicle and pivoted to be moved into positions for indicating movement of the vehicle to the right and left, rock-shafts extended longitudinally of the vehicle, and provided with twisted portions means for connecting said rock-shafts with said signaling devices, and means for operatively connecting the twisted portions of said rock-shafts with said clutch and brake levers to permit the latter to be moved longitudinally of said shafts to rock the same.

2. The combination with a motor vehicle provided with a foot-operated clutch lever and with a foot-operated brake lever, of signaling devices carried by the vehicle for indicating movement of the vehicle to the right and left, rock-shafts operatively connected with said signaling devices to move the same, and means for operatively connecting said rock-shafts with said levers to permit the latter to be moved lengthwise of said rock shafts to rock the latter and move said signaling devices by movement of said levers.

3. The combination with a motor vehicle provided with a foot-operated lever, of a rock-shaft operatively connected with said lever to be rocked by movement of the latter lengthwise of said rock shaft, and a signaling device operatively connected with said rock-shaft to be moved thereby into its operative position.

4. The combination with a motor vehicle provided with a foot-operated lever, of a rock-shaft having a twisted portion operatively connected with said lever to permit the latter to be moved lengthwise of the said twisted portion and effect rotary movement of said rock-shaft, and a signaling device operatively connected with said rock-shaft to be moved thereby into its operative position.

5. The combination with a motor vehicle provided with a lever, of a rock-shaft having a screw portion between its ends, means for connecting said lever with said rock-shaft to effect rotary movement of the rock-shaft by movement of the lever lengthwise of the said screw portion and to permit further movement of the said lever in the same direction without rotating said rock-shaft, and a signaling device operatively connected with said rock-shaft.

6. The combination with a motor vehicle provided with a lever, of a rock-shaft having a screw portion, means for connecting said lever in sliding engagement with said screw portion to rock the said shaft by movement of said lever lengthwise of said rock-shaft, and a signaling device operatively connected with said rock-shaft to be moved thereby.

In testimony whereof, we have signed our names to this specification.

LAURENCE J. KILLIAN.
EUGENE J. PARKER.